(12) United States Patent
Hetzler et al.

(10) Patent No.: US 12,736,331 B2
(45) Date of Patent: Sep. 15, 2026

(54) MEASUREMENT DEVICE FOR INTERFEROMETRIC MEASUREMENT OF A SURFACE SHAPE

(71) Applicant: Carl Zeiss SMT GmbH, Oberkochen (DE)

(72) Inventors: Jochen Hetzler, Aalen (DE); Stefan Schulte, Stoedlen (DE); Matthias Dreher, Oberkochen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 102 days.

(21) Appl. No.: 18/473,713

(22) Filed: Sep. 25, 2023

(65) Prior Publication Data

US 2024/0077305 A1 Mar. 7, 2024

Related U.S. Application Data

(63) Continuation of application No. PCT/EP2022/057155, filed on Mar. 18, 2022.

(30) Foreign Application Priority Data

Mar. 25, 2021 (DE) ..................... 10 2021 202 909.4

(51) Int. Cl.
*G01B 11/24* (2006.01)
*G01M 11/00* (2006.01)
*G01M 11/02* (2006.01)

(52) U.S. Cl.
CPC ....... *G01B 11/2441* (2013.01); *G01M 11/005* (2013.01); *G01M 11/025* (2013.01); *G01M 11/0271* (2013.01)

(58) Field of Classification Search
CPC ............ G01B 11/2441; G01B 9/02002; G01B 9/02057; G01B 9/02039; G01M 11/005; G01M 11/0271; G01M 11/025
See application file for complete search history.

(56) References Cited

U.S. PATENT DOCUMENTS 5,361,312 A 11/1994 Kuchel
5,737,079 A 4/1998 Burge et al.
(Continued)

FOREIGN PATENT DOCUMENTS

CN 104121851 A 10/2014
CN 107816939 A 3/2018
(Continued)

OTHER PUBLICATIONS

German Office Action with English translation, Application No. 10 2021 202 909.4, Nov. 29, 2021, 8 pages.
(Continued)

*Primary Examiner* — Kara E. Geisel
*Assistant Examiner* — Jonathon Cook
(74) *Attorney, Agent, or Firm* — Edell, Shapiro & Finnan, LLC

(57) ABSTRACT

A measurement apparatus (10) for interferometrically measuring a shape of a surface (12) of a test object (14) in relation to a reference shape includes a diffractive optical element (30) generating a test wave (32) from measurement radiation (22), whereas a wavefront of the test wave is adapted to a target shape of the surface of the test object and the target shape is configured as a first non-spherical surface, and a reference element (38) with a reference surface (40) having the reference shape, the reference shape being configured as a further non-spherical surface and the reference element including a low thermal expansion material with a mean coefficient of thermal expansion having an absolute value of no more than $200\times10^{-6}$ $K^{-1}$ in the temperature range from 5 °C to 35 °C.

25 Claims, 5 Drawing Sheets

(56) References Cited

U.S. PATENT DOCUMENTS

| | | | | |
|---|---|---|---|---|
| 6,312,373 | B1 | 11/2001 | Ichihara | |
| 6,573,978 | B1 | 6/2003 | McGuire | |
| 7,605,926 | B1 | 10/2009 | Hetzler et al. | |
| 7,880,897 | B2 | 2/2011 | Ge | |
| 10,101,667 | B2 | 10/2018 | Freimann et al. | |
| 10,337,850 | B2 | 7/2019 | Hetzler et al. | |
| 11,199,396 | B2 | 12/2021 | Hetzler et al. | |
| 2001/0028462 | A1* | 10/2001 | Ichihara | G01B 9/02072 356/512 |
| 2003/0002048 | A1* | 1/2003 | Zanoni | G01B 9/02057 356/512 |
| 2003/0090678 | A1* | 5/2003 | Evans | G01B 11/255 356/515 |
| 2006/0132747 | A1 | 6/2006 | Singer et al. | |
| 2006/0274325 | A1* | 12/2006 | Hetzler | G01B 9/02057 356/521 |
| 2008/0316500 | A1* | 12/2008 | Schulte | G01B 11/2441 356/521 |
| 2011/0001947 | A1 | 1/2011 | Dinger et al. | |
| 2011/0279823 | A1* | 11/2011 | Ueki | G01M 11/025 356/511 |
| 2014/0320865 | A1 | 10/2014 | Knuettel | |
| 2015/0198438 | A1 | 7/2015 | Hetzler | |
| 2016/0298951 | A1* | 10/2016 | Schulte | G01B 9/021 |
| 2017/0343449 | A1 | 11/2017 | Stiepan et al. | |
| 2018/0074303 | A1 | 3/2018 | Schwab | |
| 2018/0106591 | A1* | 4/2018 | Hetzler | G01M 11/0264 |
| 2021/0372781 | A1* | 12/2021 | Hetzler | G01M 11/005 |
| 2022/0011095 | A1 | 1/2022 | Stiepan et al. | |

FOREIGN PATENT DOCUMENTS

| | | | |
|---|---|---|---|
| CN | 107646087 | B | 4/2021 |
| DE | 102008009600 | A1 | 8/2009 |
| DE | 102012217800 | A1 | 4/2014 |
| DE | 102014206589 | A1 | 10/2015 |
| DE | 102014117511 | A1 | 6/2016 |
| DE | 102015209490 | A1 | 11/2016 |
| DE | 102017216401 | A1 | 10/2018 |
| DE | 102017217369 | A1 | 4/2019 |
| DE | 102019201762 | A1 | 8/2020 |
| DE | 102019204096 | A1 | 10/2020 |
| EP | 1614008 | B1 | 12/2009 |
| EP | 1397638 | B1 | 8/2012 |
| WO | 2016128234 | A1 | 8/2016 |

OTHER PUBLICATIONS

Otto, “Testing of the Gemini secondary mirrors”, Proceedings of SPIE, Sep. 1999, 6 pages.

Zhang et al, “Testing the large convex aspheric surfaces with aspheric test plate”, Proceedings of SPIE, Sep. 2014, 7 pages.

Smith, “Cryogenic optical testing results of JWST aspheric test plate lens”, Proceedings of SPIE, Sep. 2011, 13 pages.

Schott, “Optical Properties of Zerodur”, Technical Information, Advanced Optics, Nov. 2007, 12 pages.

Schillke, “Critical aspects of testing aspheres in interferometric setups”, Proceedings of SPIE, Sep. 1999, 9 pages.

International Search Report and International Preliminary Report on Patentability, PCT/EP2022/057155, Jul. 4, 2022, 16 pages.

Chinese Office Action with English translation, May 21, 2026 28 pages, 40 pages.

Chinese Office Action with English translation, Apr. 30, 2026, 45 pages.

* cited by examiner 101
102
103
104
105
106
107
108
109
110
111
112
113
114
115
116
117
118
119
120
121
122
123
124
124
M1
M2
M3
M4
M5
M6
x
y
z

MEASUREMENT DEVICE FOR INTERFEROMETRIC MEASUREMENT OF A SURFACE SHAPE

CROSS REFERENCE TO RELATED APPLICATIONS

This is a Continuation of International Application PCT/EP2022/057155 which has an international filing date of Mar. 18, 2022, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2021 202 909.4 filed on Mar. 25, 2021.

FIELD OF THE INVENTION

The invention relates to a measurement apparatus and a method for measuring a deviation of a shape of surface of a test object from a reference shape by interferometry.

BACKGROUND

For the highly accurate determination of a surface shape of a test object, such as a microlithographic optical element, formed as a non-spherical surface, for instance as a free-form surface, measurement arrangements comprising a diffractive optical element are known. The diffractive optical element is, for example, in the form of a computer-generated hologram (CGH) and configured so as to generate a test wave with a wavefront adapted to the target shape of the surface. Diffractive structures required to this end can be determined by a computer-aided simulation of the measurement arrangement together with the target surface and then be prepared on a substrate as CGH. By superimposing the test wave reflected by the surface with a reference wave, it is possible to determine deviations from the target shape very precisely.

DE 10 2015 209 490 A1 describes such a measurement arrangement, which is in the form of what is known as a reference mirror interferometer. In this case, a complex coded CGH generates both a test wave with a wavefront adapted to the target shape and a reference wave with a plane or spherical wavefront. Whereas the test wave is reflected back to the CGH from the surface to be measured, the reference wave has a different propagation direction and, depending on the wavefront, strikes a flat or spherical reference mirror. From the latter, the reference wave is also reflected back to the CGH. After passing through the CGH again, the reflected test wave and the reference wave come into superposition and thus create an interference pattern on the detector. The evaluation of the interference pattern allows the subsequent measurement of a deviation of the surface to be measured from the target shape and hence the actual shape of the surface. Taking into account the known wavefront of the test wave, it is naturally also possible to determine a deviation of the surface to be measured from the shape of the reference mirror by evaluating the interference pattern.

However, isolated flaws in the diffraction structure of the CGH often lead to errors in the interference pattern, resulting in measurement inaccuracies in the determination of the actual shape of the surface to be measured.

SUMMARY

It is an object of the invention to provide a measurement apparatus and a method whereby the aforementioned problems are solved, and in particular a surface measurement of the test object with improved accuracy is made possible.

According to the invention, the aforementioned object can for example be achieved by a measurement apparatus for measuring a shape of a surface of a test object in relation to a reference shape by interferometry. The measurement apparatus comprises a diffractive optical element for generating a test wave from measurement radiation, a wavefront of the test wave being adapted to a target shape of the surface of the test object and the target shape being configured as a first non-spherical surface, and a reference element with a reference surface having the reference shape, the reference shape being configured as a further non-spherical surface and the reference element comprising a low thermal expansion material with a mean coefficient of thermal expansion with an absolute value of no more than $200\times10^{-6}$ $K^{-1}$ in the temperature range from 5° C. to 35° C.

A non-spherical surface is understood to be an aspherical surface or a free-form surface. An aspherical surface is understood to be a rotationally symmetric surface which deviates from any sphere by at least 0.05 mm, in particular by at least 0.1 mm, at least 1 mm or at least 5 mm. In this document, such an aspherical surface is also referred to as a rotationally symmetric asphere or simply as an asphere. A free-form surface is understood to be a shape with a deviation from any rotationally symmetric asphere of least 5 μm, in particular least 10 μm. Furthermore, the free-form surface deviates from any sphere by at least 0.05 mm, in particular by at least 0.1 mm, at least 1 mm or at least 5 mm. In particular, the target shape of the test object surface is configured as a non-spherical surface.

The wavefront of the test wave at the location of the surface of the test object arranged in the measurement configuration is thus likewise configured as a non-spherical surface, which deviates only insignificantly, in particular by less than 1 mm or by less than 100 μm, from the target shape referred to as first non-spherical surface.

The surface shape of the test object can be determined by evaluating at least one interference pattern which by the superposition of the test wave and a reference wave whose radiation was exposed to an interaction with the reference surface. In this case, the surface shape is determined in relation to the reference shape, which is to say the reference shape serves as a reference when determining the surface shape. The deviation thus determined comprises a distribution of deviation values in relation to the reference shape, depending on the two-dimensional surface coordinate of the test object. The test object surface can then be post-processed on the basis of the determined deviation, in such a way that the shape of the test object surface is adapted with great accuracy to a comparison shape emerging from the reference shape and the position of the reference element in the beam path of the measurement apparatus. In other words, the comparison shape can be "copied". In the case where the reference shape is known with great absolute accuracy, which is to say the reference element represents an absolute reference, the surface shape can be adapted to the target shape with great accuracy by determining the surface deviation using the measurement apparatus according to the invention.

The measurement apparatus is configured in particular to measure a shape of an optical surface of an optical element of a microlithographic projection exposure apparatus, for instance a projection lens of such a projection exposure apparatus, by interferometry.

The invention is based on the insight that selective interfering reflections frequently occur in the diffraction pattern of the complex coded CGH in the reference mirror interferometer known in the prior art and lead to incorrect intensity values occurring at certain points in the interference pattern. As a rule, these then are structural defects at certain locations of the diffraction pattern, which affect only one of the waves generated at the location in question, which is to say either the test wave or the reference wave, or at least affect one of the two waves significantly more strongly than the other wave. The affected wave then exhibits a phase disturbance on account of the interfering reflection. As a result, the intensity of the interference pattern is modified, which is to say falsified, at the point of the interference pattern where the two waves interfere following a reflection at the reference mirror or test object.

One reason for the fact that a structural flaw in the diffraction pattern disturbs only the phase of one of the two waves generated by the diffraction pattern or disturbs the phase of one of the two waves significantly more than the phase of the other wave, is that, according to the insight according to the invention, the diffraction pattern partial structure responsible for generating the test wave differs significantly from the diffraction pattern partial structure responsible for generating the reference wave. The aforementioned partial structures can be diffraction structures with different periodicities, which are overlaid on one another to form the diffraction pattern at the respective location of the diffractive optical element. The reason for the significant deviation of the partial structures from one another in the reference mirror interferometer known from the prior art is in particular that the test wave and the reference wave differ considerably in their wavefronts. When a test object with a target shape of the surface configured as a non-spherical surface is measured, the wavefront of the test wave generated by the reference mirror interferometer is configured as a non-spherical surface while the reference wave has a plane or spherical wavefront.

As a result of the configuration according to the invention of the reference element with a reference shape configured as a further non-spherical surface, the wavefronts of the test wave and reference wave can be configured to be comparatively similar or identical to one another. This in turn has the consequence that a structural flaw at the relevant location of the diffractive optical element generally has a relatively uniform effect on the test wave and the reference wave. For instance, the similar configuration of the test wave and reference wave can be used to generate only one of the two waves at the diffractive optical element and subsequently generate the other wave from the first wave.

According to the invention, a reflection occurring at the diffractive optical element leads to comparable phase errors in the test wave radiated onto the surface of the test object and the reference wave, the radiation of which was exposed to an interaction with the reference surface. Successively measuring the test object using a plurality of diffractive optical units and subsequently combining the figures to remove the interfering reflections by applying OR operations, as in the prior art, can thus be avoided. This simplifies the measurement method. In particular, an insertion and removal of a plurality of diffractive optical elements into/from the measurement apparatus, which is complicated in the case of measurement in vacuo but customary in the prior art for the purpose of removing the interfering reflections by applying OR operations, can be avoided.

In other words, the interfering reflection in any case causes a phase error in both the test wave and the reference wave, with the phase error being similar or equal in magnitude, or at least having a smaller difference than conventionally. Hence, the interfering reflection causes, if anything at all, a reduced falsification of the intensity of the interference pattern at the point in question. As a result, the surface measurement of the test object can be carried out with improved accuracy using the measurement apparatus according to the invention.

As mentioned hereinabove, the reference element comprises a low thermal expansion material with a mean coefficient of thermal expansion with an absolute value of no more than $200\times10^{-6}\ K^{-1}$ in the temperature range from 5 °C to 35 °C That is to say, the coefficient of thermal expansion in the specified temperature range is at least $-200\times10^{-6}\ K^{-1}$ and at most $+200\times10^{-6}\ K^{-1}$, in particular has an absolute value of more than $50\times10^{-6}\ K^{-1}$ in the specified temperature range.

According to an embodiment, the low thermal expansion material contains a silicate glass, for example ULE® glass or Zerodur® glass. ULE® glass stands for "Ultra Low Expansion" glass and is a Corning product denoted by Corning Code 2972. Alternatively or additionally, the silicate glass can be made of Zerodur® glass, a Schott product.

According to an embodiment, both the first non-spherical surface and the further non-spherical surface are configured as a respective free-form surface.

According to a further embodiment, the test wave is directed at the reference element and the reference surface is configured to split off, in reflection, a reference wave from the radiated-in test wave. Hence, the reference wave is generated not already at the diffractive optical element but at the reference surface, specifically from the radiation of the test wave. Thus, with the exception of alignment structures optionally provided at certain locations, the diffractive optical element can be embodied as a singly coded CGH, which generates fewer interfering reflections in comparison with a CGH coded multiple times to generate the test wave and the reference wave. Furthermore, an interfering reflection occurring during the generation of the test wave at the diffractive optical element initially leads only to a phase disturbance of the test wave and, at the splitting off of the reference wave, to a corresponding phase disturbance of the reference wave. Hence, the interfering reflection leads to no falsification of the intensity of the interference pattern at the point in question.

According to a further embodiment, the reference surface is arranged on a side of the reference element which faces away from the test wave radiated onto the reference element.

According to a further embodiment, the wavefront of the test wave is adapted to the reference surface. That is to say, the wavefront of the test wave does not deviate, only deviates only insignificantly, from the reference surface at the location of the latter.

According to an embodiment, the wavefront of the test wave deviates from the reference surface by less than 1 mm, in particular less than 100 μm.

According to a further embodiment, the measurement apparatus comprises a holder configured to position the test object in the beam path of the test wave downstream of the reference element.

According to a further embodiment, the reference element is configured as an element which transmits the measurement radiation. The reference element can thus also be referred to as an optical array. In particular, it is configured to absorb a portion of the intensity of the test wave, for example up to 80% or up to 60% of the intensity of the test wave. This means that the reference element is an element which passes the measurement radiation, with a portion of the intensity of the test wave being able to be absorbed by the reference element. A portion of the non-absorbed intensity or of the intensity transmitted through the material of the reference element is reflected at the back reference surface as a reference wave. In this case, the reflected portion can merely be the 4% portion of the non-absorbed intensity which is reflected at the back side of a transmissive optical element.

According to an embodiment variant, the diffractive optical element comprises a diffraction pattern, the fill factor of which has a variation over a cross section of the emitted test wave, the variation being adapted to a variation in the thickness of the reference element over a cross section of the radiated-in test wave. A fill factor of a diffractive structure pattern is understood to be the quotient of web width to period of diffractive structures. That is to say that the fill factor can be varied independently of the period of diffractive structures by modifying the web width.

According to a further embodiment, a distance between the reference surface and the target shape of the surface of the test object varies by no more than 100 μm, in particular by no more than 10 μm, in the state where the test object is arranged in the measurement apparatus for measurement purposes. Here, the arrangement of the test object in the measurement apparatus for measurement purposes is understood to mean that the test object is aligned sufficiently accurately in the measurement apparatus in order to carry out the shape measurement of the test object surface. The distance between the reference surface and the target shape of the surface is defined for a location in question on the reference surface by the length of a line perpendicular to the reference surface, which starts at the location in question and ends at the surface of the test object with the target shape. The line corresponds to the corresponding portion of a single ray of the test wave through the location in question on the reference surface. According to the described embodiment, the above-defined distance varies by less than 100 μm, in particular by less than 10 μm, over the entire reference surface.

On account of the uniform distance, within the range of variation, between the reference surface and the target shape of the surface of the test object, the profile of a comparison shape emerging from the reference surface, as described hereinbelow, differs by less than 100 μm from the target shape of the surface of the test object. The comparison shape is obtained by projecting or displacing the points of the reference surface along the respective single ray of the test wave passing through the respective point by the mean distance of the surface of the test object from the reference surface.

According to a further embodiment, the diffractive optical element comprises diffractive alignment structures configured to generate, from the measurement radiation, a distance measuring wave focused on the surface of the test object and/or a distance measuring wave focused on a back side of the reference element facing away from the reference surface and, in Littrow reflection, an alignment reference wave.

The function for generating the distance measurement wave focused on the surface of the test object and/or the back side of the reference element corresponds to that of a cat's eye. Due to the Littrow reflection, the alignment reference wave is generated from the measurement radiation by the retroreflection of the wave radiated onto the alignment structures. By evaluating the interference patterns generated by the interference of the distance measurement waves reflected at the test object with the alignment reference wave, the working distance of the test object and/or the working distance of the reference element vis-à-vis the diffractive optical element and/or the distance of the reference element can be measured and aligned accordingly.

In an alternative embodiment, the working distance can also be measured with a laser rangefinder system by radiating a laser beam onto a suitable alignment structure on the diffractive optical element, said alignment structure being configured to deflect the laser beam in reflection such a way that it strikes the test object surface in a perpendicular fashion and is retroreflected thereby. The back-reflected laser beam is superimposed with a reference beam in the laser distance measuring system, whence the distance between the laser rangefinder system and the reflection location on the test object surface can be measured. Alternatively, the working distance can also be obtained by irradiating the back side of the test object using such a laser rangefinder system.

According to a further embodiment, the measurement apparatus is configured to vary the wavelength of the measurement radiation and determine a working distance between the test object and the reference element from interference patterns recorded for at least two different wavelengths. In this case, the interference patterns are generated in particular by a superposition of the test wave generated at the respective wavelength following its interaction with the surface of the test object and a reference wave split off from the test wave in reflection at the reference element.

According to a further embodiment, a back side of the reference element facing away from the reference surface of the reference element has a spherical shape. This allows a tilt of the reference element in relation to a target tilt position to be measured. To this end, a spherical alignment wave can be generated from the measurement radiation with the diffractive optical element, and this spherical alignment wave is radiated in autocollimation onto the spherical back side of the reference element. A deviation of the tilt position of the reference element from its target tilt position can be measured from an alignment reference pattern emerging from the superposition of the alignment wave reflected at the back side of the reference element and an alignment reference wave generated in Littrow reflection at the diffractive optical element. However, this presupposes that the positioning of the reference element in relation to the propagation direction of the spherical alignment wave is sufficiently well known. This is due to the fact that only tilting between the spherical wavefront of the alignment wave and the spherical back side of the reference element can be measured with the alignment wave radiated in autocollimation onto the spherical back side. By contrast, tilting of the reference element emerging from a displacement of the spherical back side along the spherical wavefront, in other words from a "spherization", cannot be detected using the autocollimation measurement.

According to a further embodiment, at least one surface marking is provided, in particular two surface markings are provided, on the back side of the reference element. Hence, the position of the reference element in relation to the propagation direction of the spherical alignment waves can be determined, and, hence, the lateral positioning of the reference element can be aligned accordingly. Lateral positioning is the positioning of the alignment element transverse to the direction of propagation of the spherical alignment wave. The surface markings can have a diameter in the range of 1 mm to 20 mm, for example approximately 5 mm, and a depth in the range of 20 nm and 300 nm, for example approximately 100 nm.

By aligning the lateral positioning using the at least one surface marking, it is possible to accurately determine the tilt position of the reference element measured with the spherical alignment wave radiated in autocollimation onto the back side of the reference element.

According to a further embodiment, the measurement apparatus comprises a radiation source for generating the measurement radiation, the measurement radiation radiated onto the diffractive optical element having a bandwidth of more than 10 pm, in particular of more than 50 pm or more than 100 pm.

According to an embodiment, the measurement apparatus is configured to evaluate a plurality of interference patterns determined through phase shifting in order to determine the deviation of the surface shape.

According to an embodiment, the phase shift is implemented by an incremental shift of the phase of the reference wave vis-à-vis the test wave by a displacement of the test object. The interference pattern generated at each shift step is recorded. With complex mathematical modeling and an iterative calculation, the surface topography of the test surface can be reconstructed with great accuracy from the recorded interference patterns. In this case, essentially, a derivative of the wavefront in the shift direction is calculated from the recorded interference patterns and the wavefront is subsequently calculated by integration. According to alternative embodiments, the phase shift is implemented by varying the wavelength of the measurement radiation or by static tilting of the test object.

Further, the aforementioned object can for example be achieved by a method for measuring a shape of a surface of a test object in relation to a reference shape by interferometry. The method according to the invention comprises the following steps: radiating at least a portion of a test wave, generated with a diffractive optical element, onto the surface of the test object, the wavefront of the test wave being adapted to a target shape of the surface of the test object and the target shape being configured as a first non-spherical surface, providing a reference element with a reference surface having the reference shape, the reference shape being configured as a further non-spherical surface and the reference element comprising a low thermal expansion material with a mean coefficient of thermal expansion with an absolute value of no more than $200\times10^{-6}$ $K^{-1}$ in the temperature range from 5 °C to 35 °C, and generating an interference pattern by superimposing the test wave after an interaction with the surface of the test object with a reference wave, whose radiation was exposed to an interaction with the reference surface. By evaluating the interference pattern, the deviation of the shape of the surface of the test object from the reference shape can be determined.

According to an embodiment of the method according to the invention, the diffractive optical element and the reference element are mounted in a first exchangeable module and the test object is mounted in a second exchangeable module, the measurement of the test object being followed by the second exchangeable module being replaced by a further second exchangeable module with a further test object mounted therein and the first exchangeable module being replaced by a further first exchangeable module. In the further first exchangeable module, a further diffractive optical element and a further reference element are mounted.

According to an embodiment of the method according to the invention, the reference wave is generated by partial reflection of the test wave at the reference surface.

According to a further embodiment, a portion of the test wave passing through the reference element is radiated onto the surface of the test object. In particular, this portion of the test wave is reflected at the test object.

According to a further embodiment, the test object is surrounded by an atmosphere at a pressure of at least $10^3$ mbar while the test wave is radiated in. That is to say, the test object is arranged in a pressure regime above high vacuum; in particular, the atmosphere has a pressure of at least 1 mbar, which is to say a pressure above medium vacuum, or at least 100 mbar or normal pressure. Since the interferometer cavity can be designed to be very short on account of the configuration according to the invention, it is possible to measure the test object in a relatively high pressure range or even under atmospheric pressure (approx. 1 bar).

According to a further embodiment, the reference element provided is produced in a manufacturing method in which the test wave is used to measure, by interferometry, an approximate shape of the reference surface in relation to a shape of a surface of a standardized test object. The manufacturing process described here is also referred to as first manufacturing process in this document. The standardized test object can also be referred to as a master test object and is a test object whose surface corresponds to the target shape with very high accuracy. In particular, the master test object is produced using measurement methods known from the prior art, which are often very complex, for high-precision measurement of the surface shape. For example, these measurement methods may comprise the use of a multiply coded diffractive optical element, with which it is possible to generate not only a test object wave and a reference wave but also calibration waves for the highly accurate characterization of flaws in the diffraction pattern of the diffractive optical element. In this case, the measurement may be carried out in high vacuum or in a vacuum regime with lower pressure. Such a multiply coded diffractive optical element in the form of a four-times coded CGH for generating two calibration waves is described in U.S. Pat. No. 10,337,850 B2, for example. Analogously, a five-times coded CGH, which can be used to generate three calibration waves, can also be used. After measuring the approximated shape of the reference surface in relation to the shape of the surface of the standardized test object, the reference surface is processed in a suitable manner for further convergence to a reference target shape. The reference target shape emerges from the target shape of the test object and the distance between the standardized test object and the reference surface. Since, of course, the target shape corresponds with great accuracy to the shape of the surface of the standardized test object, the reference target shape substantially results from the surface shape of the standardized test object and the distance between the standardized test object and the reference surface. Specifically, the reference target shape is obtained by displacing the points of the target shape along the respective single ray of the test wave passing through the respective point by the mean value of the distance between the target shape of the test object surface and the reference surface. In the process, the respective displacement of the points is carried out counter to the direction of the incoming test wave.

According to a further embodiment, the measurement of the approximate shape of the reference surface in relation to the shape of the surface of the standardized test object is implemented by radiating the test wave, generated by the diffractive optical element, onto the surface of the standardized test object and superimposing the test wave following the interaction with the surface of the standardized test object with the reference wave.

According to a further embodiment, a measured deviation of the reference shape of the reference surface from a reference target shape defined by the shape of the surface of the standardized test object is taken into account as a calibration deviation during an evaluation of the interference pattern generated with the test wave radiated onto the test object to be measured.

According to a further embodiment, the reference element provided is manufactured in a manufacturing method in which a deviation of an approximated shape of the reference surface from a reference target shape defined by the target shape of the surface of the test object is determined by radiating a further test wave, which is generated by a further diffractive optical element and whose wavefront is adapted to the inverse of the target shape of the surface, onto the reference surface. Furthermore, in the manufacturing method, the reference shape is produced by adapting the reference surface to the reference target shape with mechanical postprocessing on the basis of the determined deviation. The manufacturing process used here is also referred to as second manufacturing process in this document.

When determining the deviation of the approximated shape of the reference surface from the reference target shape, the further test wave in particular after the interaction with the reference surface is superimposed with a further reference wave. The further diffractive optical element is in particular configured as an at least 3-times, in particular at least 4-times or at least 5-times coded diffractive optical element for generating at least one calibration wave in addition to the further test wave and the further reference wave from measurement radiation radiated in. On the basis of the at least one calibration wave, flaws in the diffraction pattern of the diffractive optical element can be measured very accurately, as described in U.S. Pat. No. 10,337,850 B2 for the case of a four-times coded CGH. This allows the deviation of the shape of the reference surface from the reference target shape to be measured very accurately. In particular, the reference surface is measured in high vacuum or in a vacuum regime with lower pressure.

According to a further embodiment, a calibration deviation of the reference shape of the reference surface from the reference target shape is measured by interferometry with the further diffractive optical element, and the calibration deviation is taken into account when evaluating the interference pattern.

The features specified with respect to the abovementioned embodiments, exemplary embodiments or embodiment variants, etc., of the measurement apparatus according to the invention can be correspondingly applied to the measurement method according to the invention, and vice versa. These and other features of the embodiments according to the invention will be explained in the description of the figures and in the claims. The individual features can be implemented, either separately or in combination, as embodiments of the invention. Furthermore, they can describe advantageous embodiments which are independently protectable and protection for which is claimed only during or after pendency of the application, as the case may be.

BRIEF DESCRIPTION OF THE DRAWINGS

The above and further advantageous features of the invention will be illustrated in the following detailed description of exemplary embodiments according to the invention with reference to the accompanying schematic drawings. In the drawings.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figure 1:
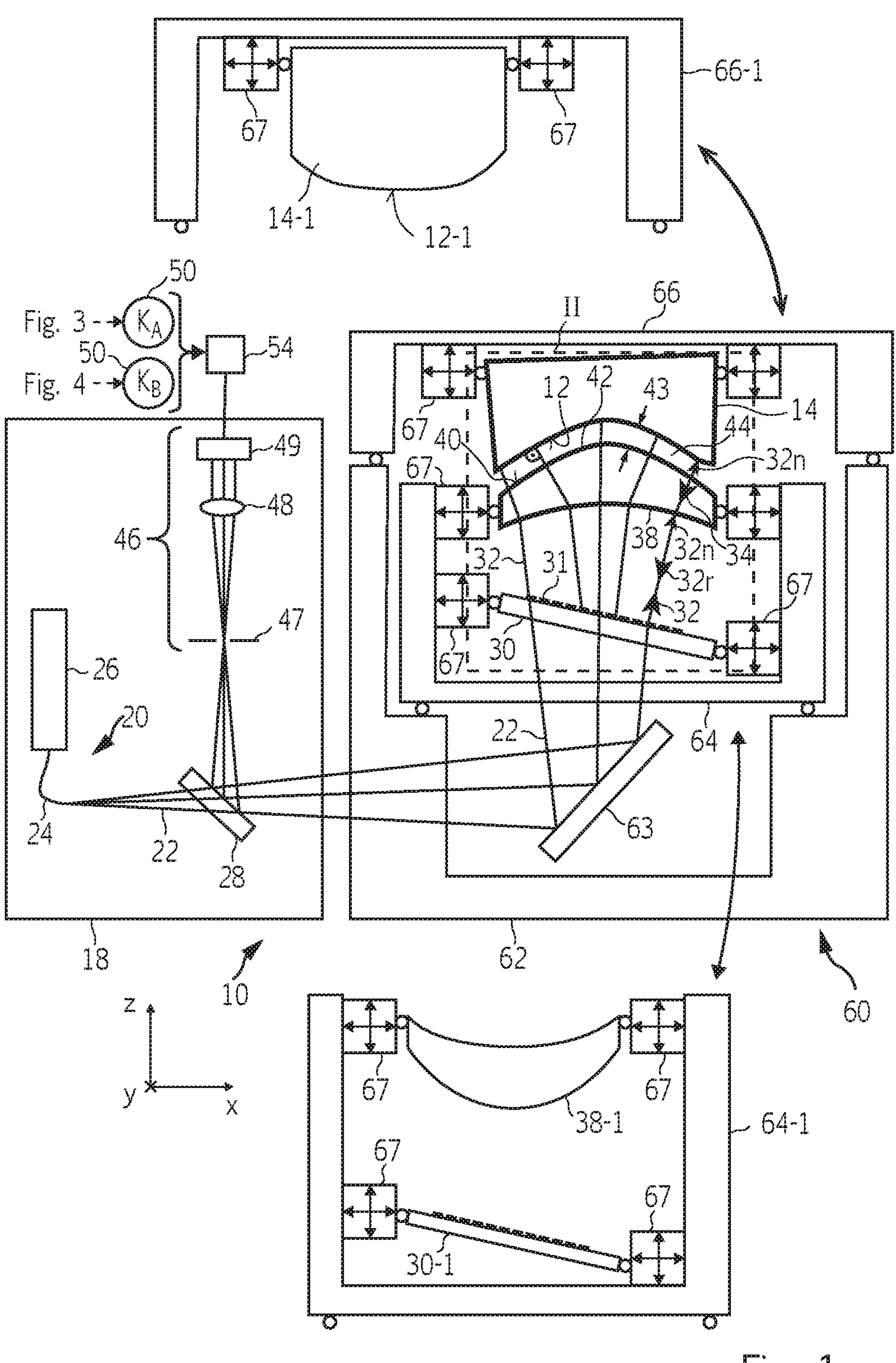
FIG. 1 shows an exemplary embodiment of a measurement apparatus for measuring an optical surface of a test object by interferometry, comprising a diffractive optical element for generating a test wave and a reference element for splitting off a reference wave from the test wave.

In order to facilitate the description, a Cartesian xyz-coordinate system is indicated in the drawing, from which system the respective positional relationship of the components illustrated in the figures is evident. In FIG. 1, the y-direction runs perpendicularly to the plane of the drawing into this plane, the x-direction runs toward the right, and the z-direction runs upward.

FIG. 1 illustrates an exemplary embodiment of a measurement apparatus 10 for measuring an optical surface 12 of a test object 14 in relation to a reference shape 42 by interferometry. Here, a deviation of the actual shape of the optical surface 12 from a target shape is determined as a result of the shape measurement, wherein the target shape can be related to the reference shape 42 in a known way, which is to say can be given thereby or else deviate therefrom in a known way. For example, the test object 14 can be a mirror of a projection exposure apparatus for EUV microlithography, for example of the projection exposure apparatus 101 illustrated in FIG. 10, having a surface 12, configured as a non-spherical surface, in particular as an aspherical surface or as a free-form surface FF, for the reflection of EUV radiation at a wavelength shorter than 100 nm, in particular at a wavelength of approximately 13.5 nm or approximately 6.8 nm. In this case, the test object 14 can be, for example, the mirror M4 of the projection lens 110 of the projection exposure apparatus 101 according to FIG. 10.

Figure 8:
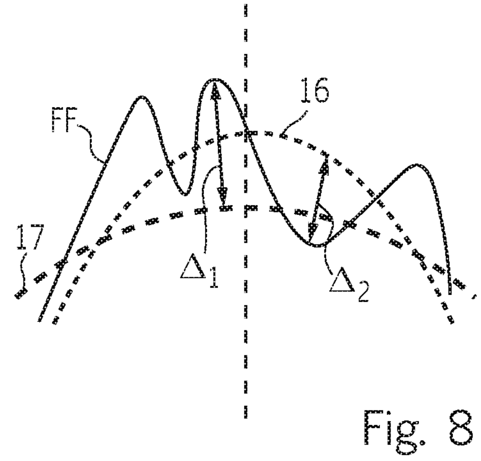
FIG. 8 shows an illustration of an asphere and a free-form surface.

FIG. 8 serves to illustrate an aspherical surface and a free-form surface FF in the sense of this document. An aspherical surface 16 is understood to be a rotationally symmetric surface which deviates from any sphere 16 by at least 0.05 mm, in particular by at least 0.1 mm, at least 1 mm or at least 5 mm. A free-form surface FF is understood to be any shape which, firstly, has a deviation $\Delta_1$ of at least 5 μm from any rotationally symmetric asphere 16 and, secondly, has a deviation $\Delta_2$ of at least 1 mm from any sphere 17. FIG. 8 illustrates the rotationally symmetric asphere 16 of all possible aspheres which has the smallest maximum deviation $\Delta_1$ from the free-form surface FF, which is to say the rotationally symmetric asphere 16 plotted in FIG. 8 is the rotationally symmetric asphere best adapted in terms of its maximum deviation $\Delta_1$ to the free-form surface FF. This also applies analogously to the sphere 17 illustrated in FIG. 8. The illustrated sphere 17 is the sphere of all possible spheres which has the smallest maximum deviation $\Delta_2$ from the free-form surface FF, which is to say the sphere 17 plotted in FIG. 8 is the sphere best adapted in terms of its maximum deviation $\Delta_2$ to the free-form surface FF.

The measurement apparatus 10 illustrated in FIG. 1 comprises an illumination/detection module 18, a main assembly 60, and an evaluation device 54. The main assembly 60 in turn comprises a base frame 62 with a deflection element 63 arranged therein, a first exchangeable module 64 in which a diffractive optical element 30 and a reference element 38 are mounted, and a second exchangeable module 66 for holding the test object 14.

The illumination/detection module 18 contains a radiation source 20 for providing a sufficiently coherent measurement radiation 22 as an input wave. In this exemplary embodiment, the radiation source 20 comprises a waveguide 24 having an exit surface which forms the origin of the input wave. The waveguide 24 is connected to a radiation-generating module 26, for example in the form of a laser. By way of example, a helium-neon laser with a wavelength of about 633 nm can be provided to this end. However, the measurement radiation 22 can also have a different wavelength in the visible or non-visible wavelength range of electromagnetic radiation. According to an embodiment, the bandwidth of the measurement radiation 22 is greater than 10 μm, in particular greater than 50 μm or greater than 100 μm. The radiation source 20 with the waveguide 24 represents merely an example of a radiation source 26 usable for the measurement apparatus 10. In alternative embodiments, rather than the waveguide 24, an optical arrangement with lens elements, mirror elements or the like can be provided for providing a suitable input wave from the measurement radiation 22.

The measurement radiation 22 initially passes through a beam splitter 28 and is subsequently incident on the diffractive optical element 30 with a diffraction pattern 31 arranged on one surface. The diffractive optical element 30 is configured as what is known as a computer-generated hologram (CGH) and is part of a test optical unit serving to generate a test wave 32 with a wavefront which is adapted to a target shape 12*s* of the surface 12 described in detail below, in particular with reference to FIG. 9, and serves to be radiated onto the surface 12 of the test object 14. The wavefront of the test wave 32 adapted to the target shape 12*s* is understood to mean that the wavefront of the test wave 32 deviates by less than 1 mm, in particular by less than 100 μm, from the target shape 12*s*. Furthermore, the shape of the reference surface 40 is configured and the reference element 38 is arranged in the beam path of the test wave 32 such that the wavefront of the test wave 32 is adapted to the reference surface 40. This should be understood to mean that the wavefront of the test wave 32 deviates from the reference surface 40 by less than 1 mm, in particular less than 100 μm.

What emerges from the reciprocal adaptation of the target shape 12*s* and the reference surface 40 to the wavefront of the test wave 32 is that a distance 43 between the reference surface 40 and the target shape 12*s* of the surface 12 of the test object 14 varies by less than 100 μm, in particular by less than 10 μm, in the state shown in FIG. 1, in which the test object 14 is arranged in the measurement apparatus 10 for measurement purposes. The arrangement of the test object 14 in the measurement apparatus 10 for measurement purposes is understood to mean that the test object 14, as explained in detail below, is aligned sufficiently accurately in the measurement apparatus 10 in order to carry out the shape measurement of the test object surface. The corresponding distance 43 at a respective location of the reference surface 40 corresponds to the length of the corresponding single ray of the test wave 32, from the respective location to the target shape 12*s* of the surface 12. The line defining the distance 43 in question is perpendicular both to the reference surface 40 and to the target shape 12*s* of the surface 12. The distance 43 varies along the target shape 12*s* by no more than 100 μm, in particular by no more than 10 μm.

Figure 9:
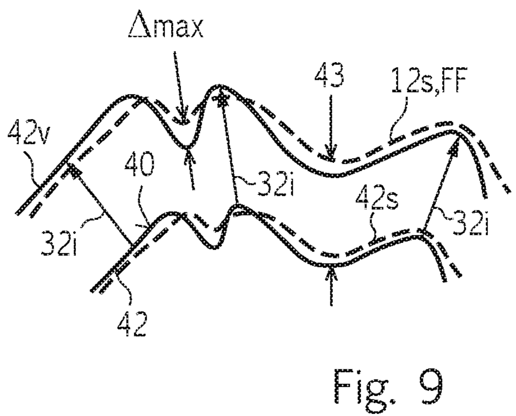
FIG. 9 shows an exemplary illustration of a target shape of the surface of the test object and a comparison shape emerging from the surface of the reference element.

As illustrated in FIG. 9, a comparison shape 42*v* of the reference shape 42 can be defined by projecting or displacing the points of the reference surface 40 along the respective single ray 32*i* of the test wave 32 running through the respective point by the mean value of the distance 43 of the target shape 12*s* of the surface 12 of the test object 14 from the reference surface 40. In the process, the respective displacement of the points is carried out in the direction of the incoming test wave 32. The inverse of the comparison shape 42*v* differs from the target shape 12*s* by the one deviation Δ which varies from point to point, wherein the maximum value of this deviation is Δmax. The inverse of the comparison shape 42*v* is understood to be the shape that a counterpart of the comparison shape 42*v* would have which can be coupled to the comparison shape 42*v* in such a way that the surface of the comparison shape 42*v* and the coupling surface of the counterpart rest on one another without gaps. In the example depicted, the comparison shape 42*v* is convex and the corresponding inverse, which substantially corresponds to the surface shape of the test object 14, is concave.

The profile of the comparison shape 42*v* has the aforementioned maximum deviation Δmax from the target shape 12*s* of the surface 12 of the test object 10, which is in the form of an asphere or free-form surface FF, where Δmax for example can be no more than 100 μm and in particular no more than 10 μm, in accordance with the maximum variation of the distance 43.

A reference target shape 42*s* in relation to the target shape 12*s* is defined in a manner analogous to the definition of the comparison shape 42*v* in relation to the reference shape 42. The reference target shape 42*s* is obtained by displacing the points of the target shape 12*s* by the mean value of the distance 43 along the respective individual ray 32*i* of the test wave 32 running through the respective point. In the process, the respective displacement of the points is carried out counter to the direction of the incoming test wave 32.

The second exchangeable module 66 serves as a holder for positioning the test object 14 in the beam path of the test wave 32 downstream of the reference element 38. Hence, the test wave 32 first passes through the reference element 38, which is configured as an element which transmits the measurement radiation 22, in other words as a lens element or as an optical array, before this test wave is incident on the surface 12 of the test object 14. The side of the reference element 38 facing the test object 14 serves as the reference surface 40. The latter is configured to split off, in reflection, a reference wave 34 from the test wave 32 radiated onto the reference element 38. In other words, a portion of the intensity of the test wave 32 is reflected at the reference surface 40. The portion of the test wave 32 passing through the reference surface 40 is incident on the optical surface 12 and is therefore also referred to as the used test wave 32*n*.

The reflected radiation forms the reference wave 34. In this case, the reflection can be effected merely by the refractive index difference between the transmissive material of the reference element 38 and the ambient atmosphere, whereby in this case the intensity of the reflected reference wave is approximately 4% of the intensity of the test wave 32 radiated in. Alternatively, a suitable coating can be applied to the reference surface 40 in order to increase the reflectivity, in particular in such a way that the intensity of the reference wave 34 generated on the reference surface 40 approximately corresponds to the intensity of the used test wave 32*n* following the reflection at the surface 12 of the test object 14 and re-entry into the reference element 38.

In order to largely avoid falsifications of the wavefront of the test wave 32 on account of temperature changes in the reference element 38, which for instance may arise due to temperature differences in the environment, the reference element 38 is manufactured from a low thermal expansion material, for instance with a mean coefficient of thermal expansion with an absolute value of no more than $200\times10^{-6}$ $K^{-1}$ in the temperature range from 5 °C to 35 °C In particular, the low thermal expansion material contains a silicate glass, for example ULE® glass. ULE® glass stands for "Ultra Low Expansion" glass and is a Corning product denoted by Corning Code 2972. Alternatively or additionally, the silicate glass can be made of Zerodur® glass, a Schott product.

The reference surface 40 has the reference shape 42, which is likewise configured as an asphere or free-form surface FF (cf. the explanations hereinabove with reference to FIG. 8).

The used test wave 32*n* returning from the surface 12 and the reference wave 34 initially pass through the reference element 38 in the reverse direction to the incoming test wave 32. Subsequently, they pass through the diffractive optical element 30 and are diffracted again in the process. In the process, there is a back transformation of the returning used test wave 32 and the reference wave 34 into an approximately spherical wave, wherein the wavefront of the used test wave 32*n* has deviations from a spherical wavefront which can be traced back to deviations of the surface 12 of the test object from the wavefront of the test wave 32 adapted to the target shape 12*s*. The wavefront of the reference wave 34 possibly also has deviations from a spherical wavefront, to be precise to the extent with which the reference shape 42 deviates from the wavefront of the radiated-in test wave 32 which has been adapted to the target shape 12*s*. In relation to one another, the wavefronts of the returning test wave 32*n* and the reference wave 34 deviate from one another to the extent with which the surface 12 deviates from the comparison shape 42*v* derived from the reference shape 42 of the reference element 38.

The region of the interferometer 10 in which the used test wave 32*n* and the reference wave 34 do not run in the same beam path is called the interferometer cavity 44. In the embodiment according to FIG. 1, the interferometer cavity 44 extends between the reference surface 40 of the reference element 38 and the surface 12 of the test object 14, and hence it is short in comparison with the common beam path of the waves 32*n* and 34.

The returning used test wave 28*n* and the reference wave 34 run to the beam splitter 28 after passing through the diffractive optical element 30. This beam splitter guides the waves out of the beam path of the radiated-in measurement radiation 22 and steers them to an observation unit 46 of the illumination/detection module 18.

Both convergent beams pass through a stop 47 and an eyepiece 48 of the observation unit 46 and are finally incident on a two-dimensionally resolving detector 49 of the observation unit 46. The detector 42 can be designed, for example, as a CCD sensor and captures an interference pattern produced by the interfering waves.

In the evaluation device 54, the actual shape of the optical surface 12 of the sample 14 is determined from the captured interference pattern or a plurality of captured interference patterns and also calibration deviations 50. The calibration deviations 50 may be calibration deviations KA, which are determined as explained hereinbelow with reference to FIG. 3, or calibration deviations $K_B$, which are determined as explained hereinbelow with reference to FIG. 4. To determine the actual shape, the evaluation device 54 comprises a suitable data processing unit and uses appropriate calculation methods. Alternatively or additionally, the measurement apparatus 10 may contain a data memory or an interface to a network in order to render possible, by way of an external evaluation unit, a determination of the surface shape with the at least one interference pattern which is stored or transmitted via the network.

Figure 7A:
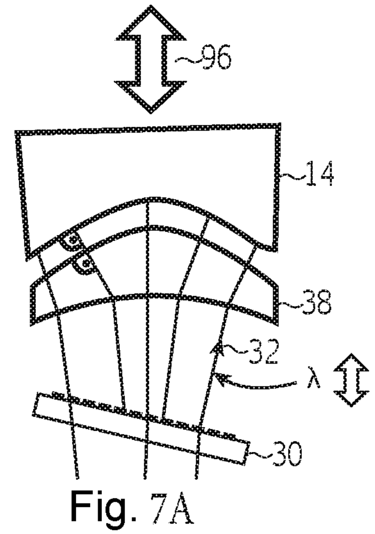
FIGS. 7A and 7B show different embodiments for the implementation of phase shifts during the measurement of the test object in the measurement apparatus according to FIG. 1.

Should a plurality of captured interference patterns be used to determine the actual shape of the optical surface 12 of the test object 14, these can be determined using phase shifting. As illustrated in FIG. 7A, phase shifting can be carried out by an incremental shift of the phase of the reference wave 34 vis-à-vis the test wave 32 by shifting the test object 14 in a shift direction 96 in the direction of the propagation direction of the test wave 32. The interference pattern generated at each shift step is recorded. With complex mathematical modeling and an iterative calculation, the surface topography of the test object 14 can be reconstructed with great accuracy in the evaluation device 54 from the recorded interference patterns. In this case, essentially, a derivative of the wavefront in the shift direction 96 is calculated from the recorded interference patterns and the wavefront is subsequently calculated by integration.

Figure 7B:
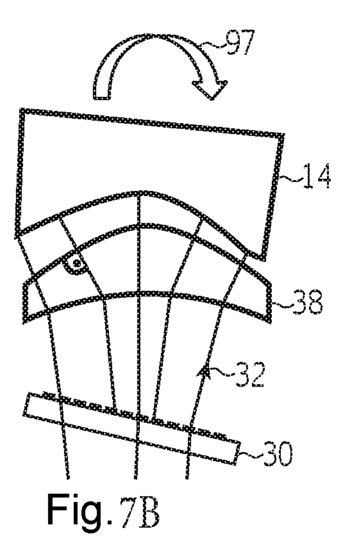

As likewise illustrated in FIG. 7A, phase shifting can be carried out, according to an alternative embodiment, by varying the wavelength λ of the measurement radiation 22. Furthermore, phase shifting can also be brought about by a tilting movement 97 of the test object 14, as illustrated in FIG. 7B. The method of phase shifting by way of a tilting movement of the test object is described in U.S. Pat. No. 5,361,312, for example.

Figures 2, 3:
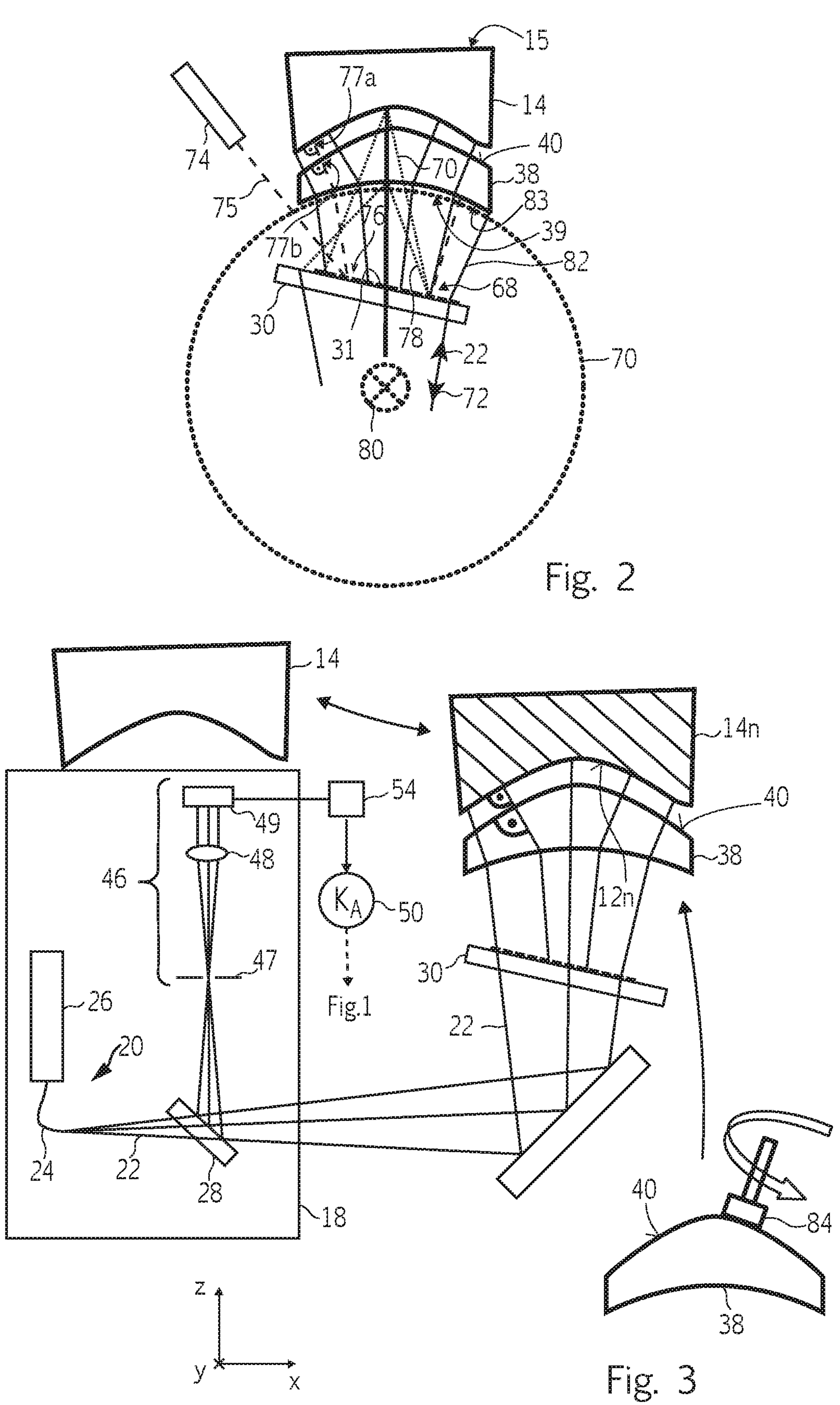
FIG. 2 shows an illustration of a portion II from FIG. 1 for illustrating the alignment of the diffractive optical element, the reference element, and the test object with respect to each other.
FIG. 3 shows an illustration of the use of the measurement apparatus according to FIG. 1 for the manufacture of the reference element in a first manufacturing method.

To measure the test object 14, the diffractive optical element 30 and the reference element 38, which as described above are each adapted to measuring the test object 14, are initially mounted on respective alignment actuators 67 in the first exchangeable module 64. Furthermore, the test object 14 is mounted on the alignment actuators 67 provided for this purpose in the second exchangeable module 66. The two exchangeable modules 64 and 66 are then inserted into the base frame 62 and, according to an embodiment, locked there at a fixed position provided for this purpose. The test object 14, the reference element 38, and the diffractive optical element 30, as described in detail hereinbelow with reference to FIG. 2, are subsequently aligned with respect to each other by adapting the various alignment actuators 67. To this end, the alignment actuators 67 are each designed for translation in all three spatial directions, with the result that the optical elements mounted thereon can each be displaced in all three spatial directions and tilted in all three tilt directions.

The test object 14 can be measured under a relatively low vacuum level or even under normal pressure on account of the configuration according to the invention of the reference element 38, which, as mentioned above, enables a short interferometer cavity 44. According to an embodiment, the main assembly 60 in the assembled state is therefore not configured as a high vacuum chamber, but rather as for instance a medium vacuum chamber or rough vacuum chamber. According to a further embodiment, the measurement is carried out under normal pressure.

Should a further test object 14-1 be measured after the measurement of the test object 14, this further test object is mounted in a further second exchangeable module 66-1 and is mounted on the base frame 62 instead of the original second exchangeable module 66. Should, as illustrated in FIG. 1, the surface 12-1 of the further test object 14-1 be adapted to a different target shape 12*s* than the surface 12 of the test object 14, then the first exchangeable module 64 is also replaced by another first exchangeable module 64-1. A further reference element 38-1 adapted to the target shape of the test object 14-1 and corresponding further diffractive optical element 30-1 are arranged in the further first exchangeable module 66-1.

FIG. 2 serves to illustrate the alignment of the diffractive optical element 30, the reference element 38, and the test object 14 relative to one another before the shape measurement is carried out. For this purpose, FIG. 2 merely illustrates the region of the measurement apparatus 30 which is labeled by II in FIG. 1, which is bounded by a dashed line, and which comprises the diffractive optical element 10, the reference element 38, and the test object 14. According to an embodiment variant, the diffraction pattern 31 of the diffractive optical element 30 comprises first diffractive alignment structures 68 at suitable locations.

The diffractive alignment structures 68 are configured to generate a distance measurement wave 22 focused on the surface 12 of the test object 14 and, in Littrow reflection, an alignment reference wave 72 from the measurement radiation 70 radiated onto the diffractive optical element 30. The distance measurement wave 70 is reflected back at the surface 12 and interferes with the alignment reference wave 72. From the resulting interference at the detector 49, it is possible to measure the working distance of the test object 14 vis-à-vis the diffractive optical element 30 and accordingly align this working distance on the basis of this information. The function for generating the distance measurement wave 70 focused on the surface 12 corresponds to that of a cat's eye. The implementation can be carried out in a manner analogous to the distance measurement illustrated in FIG. 3 of U.S. Pat. No. 7,605,926 B1, which is carried out there on the basis of the focused beam $57_1$.

As an alternative or in addition, the working distance of the test object 14 vis-à-vis the reference element 38 can also be measured with a laser rangefinder system 74. In this case, a laser beam 75 is radiated onto a suitable alignment structure 76 on the diffractive optical element 30. The alignment structure 76 is configured to deflect the laser beam 75 in reflection in such a way that it is incident on a probing site 77*a* in a manner perpendicular to the surface 12 of the test object 14 and incident on a probing site 77*b* in a manner perpendicular to the surface 40, and it is retroreflected by the latter. The back-reflected laser beam 75 is detected and the distance between 77*a* and 77*b* is determined. Alternatively, the working distance can also be obtained by irradiating the back side 15 of the test object using such a laser rangefinder system.

Furthermore or alternatively, the alignment structures 68 may be configured to generate a distance measurement wave 78 focused on a back side 39 of the reference element 38, which is to say on the opposite side of the reference element 38 to the reference surface 40, in addition to the alignment reference wave 72 from the measurement radiation 22 radiated onto the optical element 30. The distance measurement wave 78 is reflected back at the back side 39 and interferes with the alignment reference wave 72. From the resulting interference at the detector 49, the working distance of the reference element 38 can be measured and aligned accordingly, in a manner analogous to the above-described measurement of the working distance of the test object 14.

According to an embodiment variant, the back side 39 of the reference element 38 has a spherical shape 79, the center 80 of which in the illustrated exemplary embodiment is located on that side of the diffractive optical element 30 from which the measurement radiation 22 is radiated onto this element. The center 80 may also be arranged on the other side of the diffractive optical element 30. This configuration allows a measurement of a tilt of the reference element 38 vis-à-vis a target tilt position. To this end, the alignment structures 68 are further configured to generate, from the measurement radiation 22 radiated in, a spherical alignment wave 82 which is radiated in autocollimation onto the back side 39. The alignment wave 82 reflected at the back side 39 forms an alignment reference pattern on the detector 49 by superposition with the alignment reference wave 72, which is generated by diffraction in Littrow geometry. From this, a deviation of the tilt position of the reference element 38 relative to the diffractive optical element 30 can be determined.

This is due to the fact that only tilting between the spherical wavefront of the alignment wave 82 and the spherical back side 39 of the reference element 38 can be measured with the alignment wave 82 radiated in autocollimation onto the spherical back side 39. By contrast, tilting of the reference element 38 emerging from a displacement of the spherical back side 39 along the spherical wavefront, in other words from a "spherization", cannot be detected using the autocollimation measurement. In order to determine the corresponding "spherization position" of the reference element 38, the back side 39 of the reference element 38 comprises at least one surface marking 83. Hence, the position of the reference element 38 in relation to the propagation direction of the spherical alignment wave 82 can be determined, and, hence, the lateral positioning of the reference element can be aligned accordingly.

Figure 5:
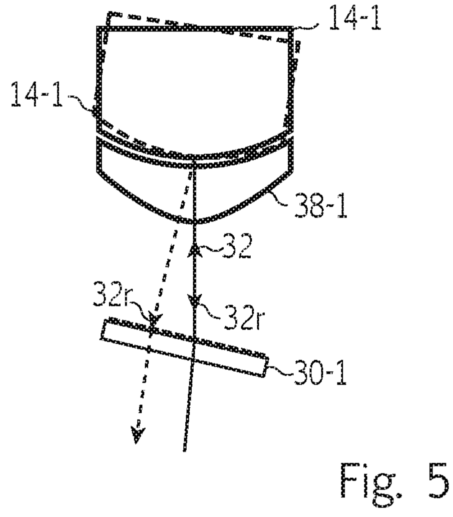
FIG. 5 shows an illustration of the change in the beam path of the test wave in the event of a tilting of the test object.

FIG. 5 illustrates the influence that a test object, in this case the convex test object 14-1, which is tilted vis-à-vis its target tilt position (solid line), has on the beam path of the test wave 32. It leads to a shearing of the beam path, to the effect of the test wave 32*r* reflected at the test object 14-1 in the tilted position passing along a different path through the reference element 38-1 (dashed line) than in the case of the non-tilted position, in which the reflected test wave 32*r* returns along the beam path of the beam path of the incoming test wave 32. If a certain refractive index inhomogeneity is assumed in the lens element material of the reference element 38-1, then the shearing of the beam path results in intensity variations occurring in the interference pattern recorded by the detector 49.

When manufacturing the reference element 38-1 in the above-described embodiment from a low thermal expansion material, for instance ULE® glass or Zerodur® glass, it is possible to achieve a refractive index homogeneity of approximately $1\times10^{-7}$, whereby the intensity variations in the interference pattern can be kept at a low level. According to an embodiment, the intensity variations which still arise are largely eliminated during the evaluation of the interference pattern by preparing the interferogram data with a band filter. The band filter used in the process is designed in particular for blocking the RMS band between 1 mm and 10 mm; in other words, the band filter comprises the function of a high-pass filter with a limit wavelength of 1 mm and of a low-pass filter with a limit wavelength of 10 mm.

Figure 6:
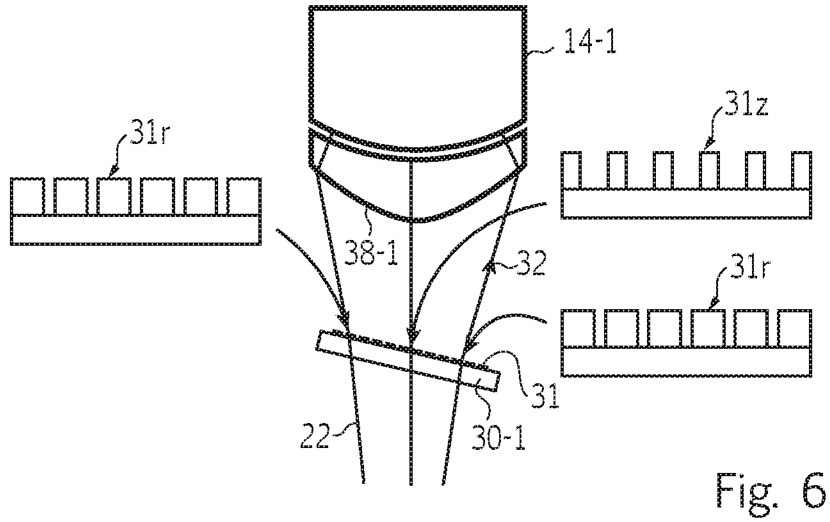
FIG. 6 shows an illustration of a variation of the fill factor of the diffraction pattern of the diffractive optical element in adaptation to the thickness variation of the reference element.

FIG. 6 illustrates an embodiment of the diffractive optical element 30-1, which can be used in particular in the manufacture of the reference element 38-1 from a low thermal expansion material, for instance ULE® glass or Zerodur® glass. In this embodiment, the fill factor of the diffraction pattern 31 is modified to compensate for the absorption loss of the measurement radiation 22 upon passage through the reference element 38-1. The fill factor of a diffraction pattern is understood to be the quotient of the web width to the period of diffraction structures. This allows the fill factor to be varied independently of the diffraction pattern period.

In the example shown in FIG. 6, the fill factor of the diffraction pattern 31 in a central region 31*z* is reduced vis-à-vis edge regions 31*r* of the diffraction pattern. Hence, the comparatively greater loss of intensity of the measurement radiation 22 on account of the greater thickness of the reference element 38*i* in the central region of the reference element 38 is compensated by a comparatively higher transmission through the diffractive optical element 30-1 in the central region 31*z*.

FIG. 3 illustrates the use of the measurement apparatus 10 in the manufacture of the reference element 38 in a first manufacturing method using what is known as a standardized test object 14*n*. The standardized test object 14*n*, which can also be referred to as "master test object", is understood to be an optical element of the shape of the test object 14, the surface 12*n* of which corresponds very precisely to the target shape 12*s*. In particular, the standardized test object 14*n* is produced using measurement methods known to a person skilled in the art, which are often very complex, for high-precision measurement of the surface shape. For example, these measurement methods may comprise the use of a multiply coded diffractive optical element, with which it is possible to generate not only a test object wave and a reference wave but also calibration waves for the highly accurate characterization of flaws in the diffraction pattern of the diffractive optical element. In this case, the measurement may be carried out in high vacuum or in a vacuum regime with lower pressure. Such a multiply coded diffractive optical element in the form of a four-times coded CGH for generating two calibration waves is described in U.S. Pat. No. 10,337,850 B2, for example. Analogously, a five-times coded CGH, which can be used to generate three calibration waves, can also be used.

In the first manufacturing method for producing the reference element 38 serving to measure the test object 14 in the measurement apparatus 10 according to FIG. 1, the reference surface 40 of the reference element 38 is initially processed using conventional grinding machines and polishing machines. Hence, the reference surface 40 can typically be approximated with an accuracy of approximately 10 μm to the reference target shape 42*s* explained above with reference to FIG. 9. The reference target shape 42*s* substantially emerges from the target shape 12*s* of the test object 14, which of course corresponds with great accuracy to the shape of the surface 12*n* of the standardized test object 14*n*, and the distance 43 between the target shape 12*s* and the reference surface 40. Now, the approximated shape of the reference surface 40 is measured in a plurality of iterations in relation to the standardized test object 14*n* with the measurement apparatus 10 and is post-processed using a grinding machine until the deviation from the reference target shape 42*s* is of order of a few nanometers. Finally, the final shape of the reference surface 40 is measured again in relation to the standardized test object 14*n* with the measurement apparatus 10. The remaining shape deviation vis-à-vis the reference target shape 42*s* is determined in the form of the above-mentioned calibration deviations KA. The calibration deviations KA are subsequently used in the measurement of the test object 14 with the measurement apparatus 10, as mentioned above with reference to FIG. 1.

Figure 4:
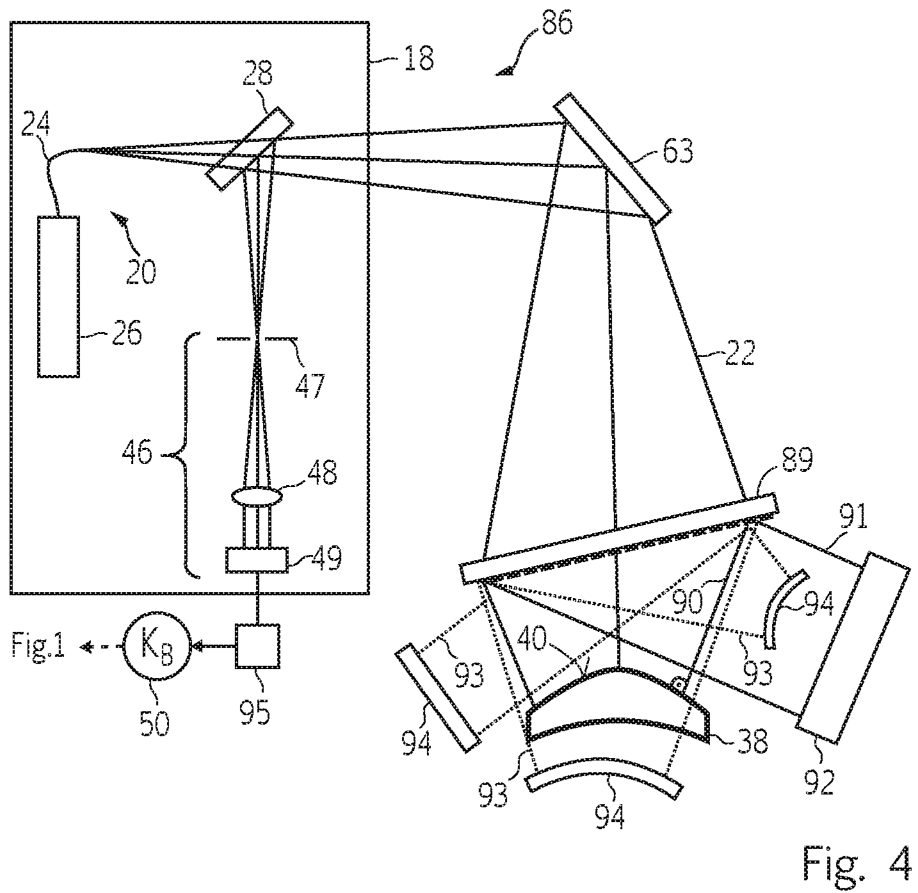
FIG. 4 shows an illustration of the use of a further interferometric measurement apparatus for the manufacture of the reference element in a second manufacturing method.

FIG. 4 illustrates a further interferometric measurement apparatus 86, which is used in the manufacture of the reference element 38 in a second manufacturing method. In this manufacturing method, the reference surface 40 of the reference element 38 is adapted very precisely to the reference target shape 42*s*; in other words, the reference element 38 is embodied as a "master reference element". In this manufacturing method, a diffractive optical element 89 in the form of a CGH is produced very precisely for the interferometric measurement apparatus 86 using techniques known to a person skilled in the art. The type of interferometric measurement apparatus 86, which comprises not only a measurement arm but also a reference arm tilted vis-à-vis the latter, is known to a person skilled in the art, for example from U.S. Pat. No. 10,337,850 B2. In the embodiment depicted in FIG. 4, the measurement apparatus 86 comprises an illumination/detection module 18 and a deflection element 63, which correspond to the illumination/detection module 18 and the deflection element 63 from FIG. 1.

The diffractive optical element 89 is configured to generate, from the measurement radiation 22 radiated in, a test wave 90 with a wavefront, adapted to the inverse of the target shape 12*s* of the surface 12 of the test object 12, for irradiation of the reference surface 40 of the reference element 38 arranged in the aforementioned measurement arm. Furthermore, the diffractive optical element 89 is configured to generate a plane or spherical reference wave 91 for irradiation of a reference mirror 92 arranged in the aforementioned reference arm, and a plurality of spherical or plane calibration waves 93 for irradiation of calibration mirrors 94 adapted to the respective wavefront of the calibration waves. An evaluation device 95 determines, from one or more, a deviation of the reference surface 40 from the reference target shape 42*s* by superposition of the test wave 90 after reflection at the reference element 38 serving as a measuring object and the reference wave 91 after reflection at the reference mirror 92.

In the case in which three calibration mirrors 94 are used, as depicted in FIG. 4, the diffractive optical element 89 can be configured as a five-times coded complex CGH. On the basis of the calibration waves 93, flaws in the diffraction pattern of the diffractive optical element 89 can be measured very accurately, as described in U.S. Pat. No. 10,337,850 B2 for the case of a four-times coded CGH. This allows the deviation of the shape of the reference surface 40 from the reference target shape 42*s* to be measured very accurately. In particular, the reference surface 40 is measured in high vacuum or in a vacuum regime with lower pressure. In a manner analogous to the first manufacturing method according to FIG. 3, the approximated shape of the reference surface 40 is measured in a plurality of iterations with the measurement apparatus 89 and the reference surface 40 is post-processed using a polishing machine until the deviation from the reference target shape 42*s* is of the order of a few nanometers. Finally, the final shape of the reference surface 40 is measured again with the measurement apparatus 89. The remaining shape deviation vis-à-vis the reference target shape 42*s* is determined, in the form of the above-mentioned calibration deviations $K_B$. The calibration deviations $K_B$ are subsequently used in the measurement of the test object 14 using the measurement apparatus 10, as mentioned above with reference to FIG. 1.

In the following, there is, by way of example, a description with reference to FIG. 10 of the essential components of the aforementioned microlithographic projection exposure apparatus 101, in which an optical element produced using the above-described measurement apparatus 10 can be used. The description of the basic structure of the projection exposure apparatus 101 and its components should not be construed as limiting here. The projection exposure apparatus 101 described here is an embodiment for EUV lithography. Analogously, an optical element produced using the measurement apparatus 10 can also be used in a projection exposure apparatus for DUV lithography. Furthermore, an optical element produced using the measurement apparatus 10 can be used for any optical application with aspheres or free-form surfaces, for example for progressive lenses, etc.

An illumination system 102 of the projection exposure apparatus 101 comprises, besides a radiation source 103, an illumination optical unit 104 for the illumination of an object field 105 in an object plane 106. What is exposed here is a reticle 107 arranged in the object field 105. The reticle 107 is held by a reticle holder 108. The reticle holder 108 is displaceable in particular in a scanning direction by way of a reticle displacement drive 109.

Figure 10:
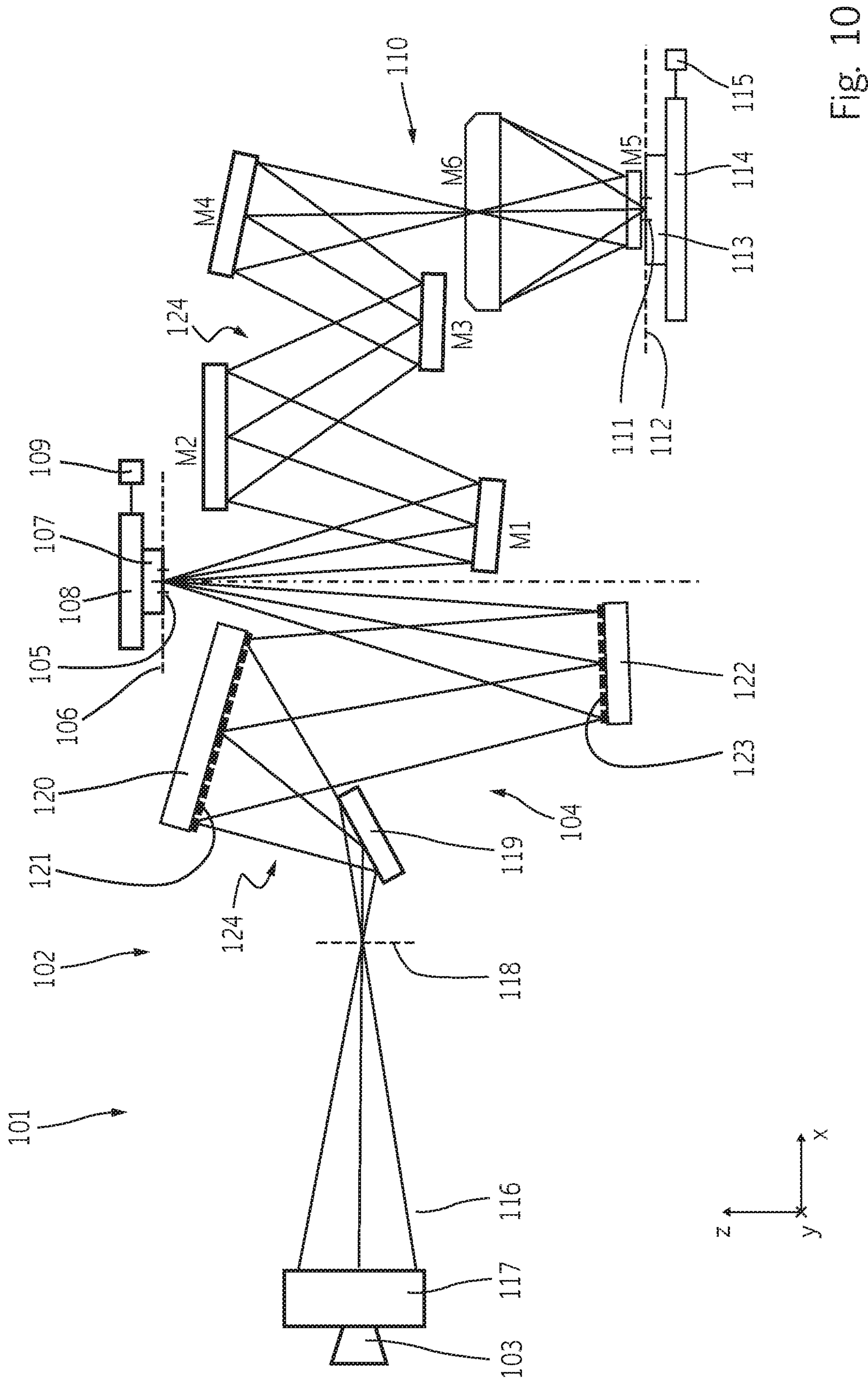
FIG. 10 shows an embodiment of a projection exposure apparatus comprising one or more optical elements produced using the measurement apparatus according to FIG. 1.

For the purposes of elucidation, a Cartesian xyz-coordinate system is depicted in FIG. 10. The y-direction runs perpendicularly into the plane of the drawing. The x-direction direction runs horizontally, and the z-direction runs vertically. The scanning direction runs in the x-direction in FIG. 10. The z-direction runs perpendicularly to the object plane 106.

The projection exposure apparatus 101 further comprises the projection lens 110 already mentioned above. The projection lens 110 serves for imaging the object field 105 into an image field 111 in an image plane 112. The image plane 112 extends parallel to the object plane 106. Alternatively, an angle that differs from 0° between the object plane 106 and the image plane 112 is also possible.

A structure on the reticle 107 is imaged onto a light-sensitive layer of a wafer 113 arranged in the region of the image field 111 in the image plane 112. The wafer 113 is held by a wafer holder 114. The wafer holder 114 is displaceable in particular in the y-direction by way of a wafer displacement drive 115. The displacement on the one hand of the reticle 107 by way of the reticle displacement drive 109 and on the other hand of the wafer 113 by way of the wafer displacement drive 115 may be synchronized with one another.

The radiation source 103 is an EUV radiation source. The radiation source 103 emits exposure radiation 116, in particular in the form of EUV radiation, which is also referred to below as used radiation. In particular, the used radiation has a wavelength in the range between 5 nm and 30 nm, in particular a wavelength of approximately 13.5 nm or approximately 6.8 nm. The radiation source 103 may be a plasma source, for example an LPP ("laser produced plasma") source or a GDPP ("gas discharged produced plasma") source. It may also be a synchrotron-based radiation source. The radiation source 103 can also be a free electron laser (FEL).

The exposure radiation 116 emerging from the radiation source 103 is focused by a collector 117. The collector 117 can be a collector with one or more ellipsoidal and/or hyperboloidal reflection surfaces. The at least one reflection surface of the collector 117 can be impinged upon by the exposure radiation 116 with grazing incidence (GI), which is to say with angles of incidence greater than 45°, or with normal incidence (NI), which is to say with angles of incidence less than 45°. The collector 117 can be structured and/or coated firstly for optimizing its reflectivity for the used radiation and secondly for suppressing extraneous light.

The exposure radiation 116 propagates through an intermediate focus in an intermediate focal plane 118 downstream of the collector 117. The intermediate focal plane 118 can represent a separation between a radiation source module, having the radiation source 103 and the collector 117, and the illumination optical unit 104. The course of the exposure radiation 116 through the illumination optical unit 104 and the projection lens 110 is referred to hereinafter as the used beam path 124.

The illumination optical unit 104 comprises a deflection mirror 119 and, arranged downstream thereof in the beam path, a first facet mirror 120. The deflection mirror 119 may be a plane deflection mirror or, alternatively, a mirror with a beam-influencing effect going beyond a pure deflection effect. As an alternative or in addition thereto, the mirror 119 can be embodied as a spectral filter separating a used light wavelength of the exposure radiation 116 from extraneous light having a wavelength that deviates therefrom. If the first facet mirror 120 is arranged in a plane of the illumination optical unit 104 which is optically conjugate to the object plane 106 as a field plane, then this facet mirror is also referred to as a field facet mirror. The first facet mirror 120 comprises a multiplicity of individual first facets 121, which are also referred to as field facets below. Only a few of these facets 121 are illustrated in FIG. 10 in exemplary fashion.

The first facets 121 can be in the form of macroscopic facets, in particular in the form of rectangular facets or in the form of facets with an arcuate peripheral contour or a peripheral contour formed as partly circular. The first facets 121 may be in the form of plane facets or alternatively as facets with convex or concave curvature.

As is known for example from DE 10 2008 009 600 A1, the first facets 121 themselves can also each be composed of a multiplicity of individual mirrors, in particular a multiplicity of micromirrors. The first facet mirror 120 may in particular be in the form of a microelectromechanical system (MEMS system). For details, reference is made to DE 10 2008 009 600 A1.

The exposure radiation 116 travels horizontally, which is to say in the y-direction, between the collector 117 and the deflection mirror 119.

In the used beam path of the illumination optical unit 104, the aforementioned second facet mirror 122 is arranged downstream of the first facet mirror 120. Provided the second facet mirror 122 is arranged in a pupil plane of the illumination optical unit 104, it is also referred to as a pupil facet mirror. The second facet mirror 122 can also be arranged at a distance from a pupil plane of the illumination optical unit 104. In this case, the combination of the first facet mirror 120 and the second facet mirror 122 is also referred to as a specular reflector. Specular reflectors are known from US 2006/0132747 A1, EP 1 614 008 B1, and U.S. Pat. No. 6,573,978.

The second facet mirror 122 comprises a plurality of second facets 123. In the case of a pupil facet mirror, the second facets 123 are also referred to as pupil facets.

The second facets 123 may likewise be macroscopic facets, which may for example have a round, rectangular or else hexagonal boundary, or may alternatively be facets composed of micromirrors. In this regard, reference is likewise made to DE 10 2008 009 600 A1.

The second facets 123 may have plane reflection surfaces or alternatively reflection surfaces with a convex or concave curvature.

The illumination optical unit 104 consequently forms a doubly faceted system. This basic principle is also referred to as fly's eye integrator.

It may be advantageous to arrange the second facet mirror 122 not exactly in a plane that is optically conjugate to a pupil plane of the projection lens 119.

The individual first facets 121 are imaged into the object field 105 using the second facet mirror 122. The second facet mirror 122 is the last beam-shaping mirror or indeed the last mirror for the exposure radiation 116 in the used beam path 124 upstream of the object field 105.

In a further embodiment (not illustrated) of the illumination optical unit 104, a transfer optical unit can be arranged in the used beam path between the second facet mirror 122 and the object field 105, with the transfer optical unit contributing in particular to the imaging of the first facets 121 into the object field 105. The transfer optical unit may have exactly one mirror, or alternatively have two or more mirrors, which are arranged one behind the other in the used beam path of the illumination optical unit 104. The transfer optical unit may in particular comprise one or two normal-incidence mirrors (NI mirrors) and/or one or two grazing-incidence mirrors (GI mirrors).

In the embodiment shown in FIG. 10, the illumination optical unit 104 comprises exactly three mirrors downstream of the collector 117, specifically the deflection mirror 119, the field facet mirror 120, and the pupil facet mirror 122.

The deflection mirror 119 can also be dispensed with in a further embodiment of the illumination optical unit 104, and so the illumination optical unit 104 can then have exactly two mirrors downstream of the collector 117, specifically the first facet mirror 120 and the second facet mirror 122.

The imaging of the first facets 121 into the object plane 106 with the second facets 123 or using the second facets 123 and a transfer optical unit is, as a rule, only approximate imaging.

The projection lens 110 comprises a plurality of mirrors Mi, which are consecutively numbered in accordance with their arrangement in the used beam path of the projection exposure apparatus 101.

In the example shown in FIG. 10, the projection lens 110 includes six mirrors M1 to M6. Alternatives with four, eight, ten, twelve or any other number of mirrors Mi are likewise possible. The penultimate mirror M5 and the last mirror M6 each have a passage opening in the form of the aforementioned hole 84 for the exposure radiation 116. The projection lens 110 is a doubly obscured optical unit. The projection lens 110 has an image-side numerical aperture that is greater than 0.5 and may also be greater than 0.6, and may be for example 0.7 or 0.75.

Reflection surfaces of the mirrors Mi can be in the form of free-form surfaces without an axis of rotational symmetry. Alternatively, the reflection surfaces of at least some of the mirrors Mi can be designed as aspherical surfaces with exactly one axis of rotational symmetry of the reflection surface shape. Just like the mirrors of the illumination optical unit 4, the mirrors Mi can have highly reflective coatings for the exposure radiation 116. These coatings can be designed as multilayer coatings, in particular with alternating layers of molybdenum and silicon.

The projection lens 110 has a large object-image offset in the y-direction between a y-coordinate of a center of the object field 105 and a y-coordinate of the center of the image field 111. This object-image offset in the y-direction can be of approximately the same magnitude as a z-distance between the object plane 106 and the image plane 112.

The projection lens 110 may in particular have an anamorphic form. In particular, it has different imaging scales $\beta_x$, $\beta_y$ in the x- and y-directions. The two imaging scales $\beta_x$, $\beta_y$ of the projection lens 110 are preferably $(\beta_x, \beta_y)=(+/-0.25, /+-0.125)$. A positive imaging scale β means imaging without image inversion. A negative sign for the imaging scale β means imaging with image inversion.

The projection lens 110 thus leads to a reduction in the ratio 4:1 in the x-direction, which is to say in the direction perpendicular to the scanning direction. The projection lens 110 leads to a reduction of 8:1 in the y-direction, which is to say in the scanning direction. Other imaging scales are likewise possible. Imaging scales with the same signs and the same absolute values in the x-direction and y-direction are also possible, for example with absolute values of 0.125 or 0.25.

The number of intermediate image planes in the x-direction and in the y-direction in the used beam path between the object field 105 and the image field 111 can be the same or can differ depending on the form of the projection lens 110. Examples of projection lenses with different numbers of such intermediate images in the x- and y-directions are known from US 2018/0074303 A1.

In each case one of the pupil facets 123 is assigned to exactly one of the field facets 121 to form a respective illumination channel for illuminating the object field 105. In particular, this can yield illumination according to the Köhler principle. The far field is decomposed into a multiplicity of object fields 105 with the aid of the field facets 121. The field facets 121 generate a plurality of images of the intermediate focus on the pupil facets 123 respectively assigned thereto.

By way of an assigned pupil facet 123, the field facets 121 are imaged in each case onto the reticle 107 in a manner overlaid on one another for the purpose of illuminating the object field 105. The illumination of the object field 105 is in particular as homogeneous as possible. It preferably has a uniformity error of less than 2%. The field uniformity can be achieved by overlaying different illumination channels.

The illumination of the entrance pupil of the projection lens 110 can be defined geometrically by way of an arrangement of the pupil facets. The intensity distribution in the entrance pupil of the projection lens 110 can be set via the selection of the illumination channels, in particular the subset of the pupil facets which guide light. This intensity distribution is also referred to as illumination setting.

A likewise preferred pupil uniformity in the region of sections of an illumination pupil of the illumination optical unit 104 that are illuminated in a defined manner can be achieved by a redistribution of the illumination channels.

Further aspects and details of the illumination of the object field 105 and in particular of the entrance pupil of the projection lens 110 are described hereinbelow.

In particular, the lens 110 can comprise a homocentric entrance pupil. The latter can be accessible. It can also be inaccessible.

The entrance pupil of the projection lens 110 generally cannot be illuminated exactly with the pupil facet mirror 122. The aperture rays often do not intersect at a single point when imaging the projection lens 110 which telecentrically images the center of the pupil facet mirror 122 onto the wafer 113. However, it is possible to find a surface area in which the spacing of the aperture rays, determined in pairwise fashion, is minimal. This surface area represents the entrance pupil or an area in real space that is conjugate thereto. In particular, this surface area has a finite curvature.

It may be the case that the projection lens 110 has different poses of the entrance pupil for the tangential beam path and for the sagittal beam path. In this case, an imaging element, in particular an optical component part of the transfer optical unit, should be provided between the second facet mirror 122 and the reticle 107. With the aid of this optical element, the different poses of the tangential entrance pupil and the sagittal entrance pupil can be taken into account.

In the arrangement of the components of the illumination optical unit 104 depicted in FIG. 10, the pupil facet mirror 122 is arranged in a surface conjugate to the entrance pupil of the projection lens 110. The field facet mirror 120 is tilted with respect to the object plane 105. The first facet mirror 120 is tilted with respect to an arrangement plane defined by the deflection mirror 119.

The first facet mirror 120 is tilted with respect to an arrangement plane defined by the second facet mirror 122.

The above description of exemplary embodiments, embodiments or embodiment variants should be understood to be by way of example. The disclosure effected thereby firstly enables the person skilled in the art to understand the present invention and the advantages associated therewith, and secondly encompasses alterations and modifications of the described structures and methods that are also within the understanding of the person skilled in the art. Therefore, all such alterations and modifications, insofar as they fall within the scope of the invention in accordance with the definition in the accompanying claims, and equivalents are intended to be covered by the protection of the claims.

LIST OF REFERENCE SIGNS

10 Measurement apparatus
12 Surface
12-1 Surface of the further test object
12*s* Target shape of the surface
12*n* Surface of the standardized test object
14 Test object
14-1 Further test object
14*n* Standardized test object
15 Back side of the test object
16 Rotationally symmetric asphere
17 Sphere
18 Illumination/detection module
20 Radiation source
22 Measurement radiation
24 Waveguide
26 Radiation-generating module
28 Beam splitter
30 Diffractive optical element
30-1 Further diffractive optical element
31 Diffraction pattern
31*r* Edge region of the diffraction pattern
31*z* Central region of the diffraction pattern
32 Test wave
32*i* Single ray of the test wave
32*n* Used test wave
32*r* Reflected test wave
34 Reference wave
38 Reference element
38-1 Further reference element
39 Back side of the reference element
40 Reference surface
42 Reference shape
42*s* Reference target shape
42*v* Comparison shape
43 Distance between reference surface and target shape
44 Interferometer cavity
46 Observation unit
47 Stop
48 Eyepiece
49 Detector
50 Calibration Deviations
54 Evaluation device
60 Main assembly
62 Base frame
63 Deflection element
64 First exchangeable module
64-1 Further first exchangeable module
66 Second exchangeable module
66-1 Further second exchangeable module
67 Alignment actuator
68 First diffractive alignment structures
70 Distance measurement wave
72 Alignment reference wave
74 Laser rangefinder system 74
75 Laser beam
76 Alignment structure
77*a* Probing location
77*b* Probing location
78 Distance measurement wave
79 Spherical shape
80 Center
82 Spherical alignment wave
83 Surface marking
84 Grinding machine
86 Further interferometric measurement apparatus
89 Diffractive optical element
90 Test wave
91 Reference wave
92 Reference mirror
93 Calibration wave
94 Calibration mirror
95 Evaluation device
96 Shift direction
97 Tilting movement
101 Microlithographic projection exposure apparatus
102 Illumination system
103 Radiation source
104 Illumination optical unit
105 Object field
106 Object plane
107 Reticle
108 Reticle holder
109 Reticle displacement drive
110 Projection lens

111 Image field
112 Image plane
113 Wafer
114 Wafer holder
115 Wafer displacement drive
116 Exposure radiation
117 Collector
118 Intermediate focal plane
119 Deflection mirror
120 First facet mirror
121 Facets
122 Second facet mirror
123 Facets
124 Used beam path
M1-M6 Mirrors
FF Free-form surface
$\Delta_1$ Minimum deviation from a rotationally symmetric asphere
$\Delta_2$ Minimum deviation from a sphere

What is claimed is:

1. A measurement apparatus for interferometrically measuring a shape of a surface of a test object in relation to a reference shape, comprising:

a diffractive optical element configured to generate a test wave from measurement radiation, a wavefront of the test wave being adapted to a target shape of the surface of the test object and the target shape being configured as a first non-spherical surface, and a reference element with a reference surface having the reference shape, the reference shape being configured as a further non-spherical surface and the reference element comprising a low thermal expansion material with a mean coefficient of thermal expansion having an absolute value of no more than $200\times10^{-6}$ $K^{-1}$ in a temperature range from 5 °C to 35 °C, wherein the diffractive optical element comprises a diffraction pattern, a fill factor of which has a variation over a cross section of the emitted test wave, the variation being adapted to a variation in the thickness of the reference element over a cross section of the radiated-in test wave.

2. The measurement apparatus as claimed in claim 1, wherein the low thermal expansion material comprises a silicate glass.

3. The measurement apparatus as claimed in claim 1, wherein the low thermal expansion material comprises a ULE glass or Zerodur glass.

4. The measurement apparatus as claimed in claim 1, further comprising a first exchangeable module which is replaceable by a further first exchangeable module and a second exchangeable module which is replaceable by a further second exchangeable module, the diffractive optical element and the reference element being mounted in the first exchangeable module, and the second exchangeable module being configured to hold the test object.

5. The measurement apparatus as claimed in claim 1, wherein both the first non-spherical surface and the further non-spherical surface are configured as respective free-form surfaces.

6. The measurement apparatus as claimed in claim 1, wherein the test wave is directed at the reference element and the reference surface is configured to split off, in reflection, a reference wave from the radiated-in test wave.

7. The measurement apparatus as claimed in claim 6, wherein the reference surface is arranged on a side of the reference element which faces away from the test wave radiated onto the reference element.

8. The measurement apparatus as claimed in claim 1, wherein the diffractive optical element is configured such that the wavefront of the test wave is adapted to the reference surface.

9. The measurement apparatus as claimed in claim 1, comprising a holder configured to position the test object in the beam path of the test wave downstream of the reference element.

10. The measurement apparatus as claimed in claim 1, wherein the reference element is configured as an element which transmits the measurement radiation.

11. The measurement apparatus as claimed in claim 1, wherein a distance between the reference surface and the target shape of the surface of the test object varies by no more than 100 μm in a state in which the test object is arranged in the measurement apparatus.

12. The measurement apparatus as claimed in claim 1, wherein the diffractive optical element comprises diffractive alignment structures configured to generate, from the measurement radiation, a distance measuring wave focused on the surface of the test object and/or a distance measuring wave focused on a back side of the reference element facing away from the reference surface and, wherein the diffractive alignment structures are further configured to generate, from the measurement radiation, in Littrow reflection, an alignment reference wave.

13. The measurement apparatus as claimed in claim 1, configured to vary the wavelength of the measurement radiation and determine a working distance between the test object and the reference element from interference patterns recorded for at least two different wavelengths.

14. The measurement apparatus as claimed in claim 1, wherein a back side of the reference element facing away from the reference surface of the reference element has a spherical shape.

15. The measurement apparatus as claimed in claim 1, comprising a radiation source configured to generate the measurement radiation, wherein the measurement radiation radiated onto the diffractive optical element has a bandwidth of more than 10 pm.

16. A method for interferometrically measuring a shape of a surface of a test object in relation to a reference shape, comprising:

radiating at least a portion of a test wave, generated with a diffractive optical element, onto the surface of the test object, the wavefront of the test wave being adapted to a target shape of the surface of the test object and the target shape being configured as a first non-spherical surface, providing a reference element with a reference surface having the reference shape, the reference shape being configured as a further non-spherical surface and the reference element comprising a low thermal expansion material with a mean coefficient of thermal expansion having an absolute value of no more than $200\times10^{-6}$ $K^{-1}$ in a temperature range from 5 °C to 35 °C, and generating an interference pattern by superimposing the test wave after an interaction with the surface of the test object with a reference wave, whose radiation was exposed to an interaction with the reference surface, wherein the diffractive optical element comprises a diffraction pattern, a fill factor of which has a variation over a cross section of the emitted test wave, the variation being adapted to a variation in the thickness of the reference element over a cross section of the radiated-in test wave.

17. The method as claimed in claim 16, wherein the diffractive optical element and the reference element are mounted in a first exchangeable module and the test object is mounted in a second exchangeable module, the measurement of the test object being followed by the second exchangeable module being replaced by a further second exchangeable module with a further test object mounted therein and the first exchangeable module being replaced by a further first exchangeable module, in which a further diffractive optical element and a further reference element are mounted.

18. The method as claimed in claim 16, wherein the reference wave is generated by partial reflection of the test wave at the reference surface.

19. The method as claimed in claim 16, wherein a portion of the test wave passing through the reference element is radiated onto the surface of the test object.

20. The method as claimed in claim 16, wherein the test object is surrounded by an atmosphere at a pressure of at least $10^{-3}$ mbar while the test wave is radiated in.

21. The method as claimed in claim 16, wherein the reference element provided is produced in a manufacturing method in which the test wave is used interferometrically to measure an approximate shape of the reference surface in relation to a shape of a surface of a standardized test object.

22. The method as claimed in claim 21, wherein the measurement of the approximate shape of the reference surface in relation to the shape of the surface of the standardized test object is implemented by radiating the test wave, generated with the diffractive optical element, onto the surface of the standardized test object and superimposing the test wave, following the interaction with the surface of the standardized test object, with the reference wave.

23. The method as claimed in claim 21, wherein a measured deviation of the reference shape of the reference surface from a reference target shape defined by the shape of the surface of the standardized test object is taken into account as a calibration deviation during an evaluation of the interference pattern generated with the test wave radiated onto the test object to be measured.

24. The method as claimed in claim 16, wherein the reference element provided is produced in a manufacturing method in which:

a deviation of an approximated shape of the reference surface from a reference target shape defined by the target shape of the surface of the test object is determined by radiating a further test wave, which is generated with a further diffractive optical element and whose wavefront is adapted to the inverse of the target shape of the surface, onto the reference surface, and the reference shape is produced by adapting the reference surface to the reference target shape with mechanical postprocessing based on the determined deviation.

25. The method as claimed in claim 24, wherein a calibration deviation of the reference shape of the reference surface from the reference target shape is measured interferometrically using the further diffractive optical element, and the calibration deviation is taken into account when evaluating the interference pattern.

* * * * *